US012275324B2

(12) United States Patent
Sato et al.

(10) Patent No.: US 12,275,324 B2
(45) Date of Patent: Apr. 15, 2025

(54) CHARGING SYSTEM, VEHICLE POSITION MANAGEMENT PROGRAM FOR CHARGING SYSTEM, AND VEHICLE POSITION MANAGEMENT METHOD FOR CHARGING SYSTEM

(71) Applicant: TOYOTA JIDOSHA KABUSHIKI KAISHA, Toyota (JP)

(72) Inventors: Masaaki Sato, Susono (JP); Satoshi Kondo, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 17/987,923

(22) Filed: Nov. 16, 2022

(65) Prior Publication Data

US 2023/0166625 A1 Jun. 1, 2023

(30) Foreign Application Priority Data

Nov. 29, 2021 (JP) .................................. 2021-193273

(51) Int. Cl.
*B60L 53/00* (2019.01)
*B60L 53/16* (2019.01)
*B60L 53/66* (2019.01)
*B60L 53/67* (2019.01)

(52) U.S. Cl.
CPC ............... *B60L 53/66* (2019.02); *B60L 53/16* (2019.02); *B60L 53/67* (2019.02)

(58) Field of Classification Search
CPC .......... B60L 53/66; B60L 53/67; B60L 53/16
USPC .......................................................... 701/22
See application file for complete search history.

(56) References Cited

U.S. PATENT DOCUMENTS

2020/0198489 A1 6/2020 Yoon
2022/0055491 A1* 2/2022 Labell ..................... B60L 53/30

FOREIGN PATENT DOCUMENTS

| CN | 112744105 A | * | 5/2021 | ............. B60L 53/16 |
| EP | 3647107 A1 | * | 5/2020 | ............. B60L 53/14 |
| JP | 2011-089291 A | | 5/2011 | |
| JP | 2020-102220 A | | 7/2020 | |
| JP | 2021-035248 A | | 3/2021 | |
| KR | 101860797 B1 | * | 5/2018 | |
| WO | WO-2014074424 A2 | * | 5/2014 | ................ B60L 3/12 |

* cited by examiner

*Primary Examiner* — Tiffany P Young
(74) *Attorney, Agent, or Firm* — Dinsmore & Shohl LLP

(57) ABSTRACT

A charging system is provided. The charging system includes an arm mechanism configured to grasp a charging cable extending from the charging apparatus and connecting a charging cable to a vehicle-to-be-charged. The charging system includes a control unit configured to indicate the vehicle-to-be-charged a charging position for connecting the charging cable thereto. The control unit is configured to give a parking position adjustment instruction to either one of the vehicle-to-be-charged or a parking-section-for-charging sliding mechanism for moving vehicles parked in the charging area so as to make a first spacing to be wider than a second spacing. The first spacing is a spacing between the vehicle-to-be-charged and an adjacent vehicle on a charge port side of the vehicle-to-be-charged and the second spacing is a spacing between the vehicle-to-be-charged and an adjacent vehicle on a side opposite the charge port side of the vehicle-to-be-charged.

8 Claims, 9 Drawing Sheets

CHARGING SYSTEM, VEHICLE POSITION MANAGEMENT PROGRAM FOR CHARGING SYSTEM, AND VEHICLE POSITION MANAGEMENT METHOD FOR CHARGING SYSTEM

CROSS REFERENCE TO RELATED APPLICATIONS

This application is based upon and claims the benefit of priority from Japanese patent application No. 2021-193273, filed on Nov. 29, 2021, the disclosure of which is incorporated herein in its entirety by reference.

BACKGROUND

The present disclosure relates to a charging system, a vehicle position management program for a charging system, and a vehicle position management method for a charging system such as a charging system including an arm mechanism for automatically inserting and removing a charging plug from a charge port (i.e. socket) of a vehicle, a vehicle position management program for the charging system, and a vehicle position management method for the charging system.

In recent years, battery electric vehicles (BEV) including plug-in hybrid electric vehicles (HEV) have become widespread. Further, self-driving technique for vehicles has been improving. Under such circumstances, a system of valet parking has been proposed in which a vehicle, which is parked in a parking space at a location different from the location where a person who is a to-be-occupant of the vehicle gets into the vehicle, travels autonomously without any human driver on board between the parking space and the location where the to-be-occupant of the vehicle gets into the vehicle. In the case where, the battery electric vehicle needs to be charged at the parking space, and a method of charging a battery electric vehicle at a parking space has been proposed. An example of the aforementioned technique is disclosed in Japanese Unexamined Patent Application Publication No. 2020-102220.

An automated valet parking system described in Japanese Unexamined Patent Application Publication No. 2020-102220 includes steps of: activating an automated valet parking procedure; determining whether charging of an electric vehicle is needed or not; setting a parking space for wireless charging service as a first target position when charging of the electric vehicle is needed; transmitting, by an infrastructure, the first target position and a guide route to the electric vehicle; setting an empty parking space as a second target position after the charging of the electric vehicle is completed; and transmitting the second target position and the guide route to the electric vehicle.

SUMMARY

When an arm mechanism inserts a charging plug into a charge port of a vehicle, an open space is required to handle the arm mechanism. However, there is a limitation to the size of a parking area, and there has been a demand to accommodate as many number of vehicles as possible in such a parking area limited in size. The technique disclosed in Japanese Unexamined Patent Application Publication No. 2020-102220, on the contrary, has a problem that parking efficiency is not satisfactory in parking areas with charging stations installed (function of charging vehicles).

The present disclosure has been made to solve the problem mentioned above and an object of the present disclosure is to increase the number of vehicles that can be parked per size (area) of the parking area with charging stations installed (function of charging vehicles).

A first exemplary aspect is a charging system for charging a vehicle-to-be-charged among a plurality of vehicles placed on standby in a charging area by connecting a charging cable extending from a charging apparatus to the vehicle-to-be-charged, comprising:

an arm mechanism configured to grasp the charging cable extending from the charging apparatus and connecting the charging cable to the vehicle-to-be-charged; and a control unit configured to indicate the vehicle-to-be-charged of a charging position at which the charging cable is connected to the vehicle, wherein the control unit is configured to give a parking position adjustment instruction to either one of the vehicle-to-be-charged or a parking-section-for-charging sliding mechanism for moving vehicles parked in the charging area so as to make a first spacing wider than a second spacing, the first spacing being a spacing between the vehicle-to-be-charged and an adjacent vehicle on a charge port side of the vehicle-to-be-charged and the second spacing being a spacing between the vehicle-to-be-charged and an adjacent vehicle on a side opposite the charge port side of the vehicle-to-be-charged.

Another exemplary aspect is a vehicle position management program for a charging system for charging a vehicle-to-be-charged among a plurality of vehicles placed on standby in a charging area by connecting a charging cable extending from a charging apparatus to the vehicle-to-be-charged, the program being executed by a control unit of the charging system configured to indicate a charging position for the vehicle-to-be-charged and adapted to cause the charging system to perform:

an arm mechanism control process of grasping the charging cable extending from the charging apparatus and connecting the charging cable to the vehicle-to-be-charged; and a positon control process of indicating the vehicle-to-be-charged a charging position for connecting the charging cable thereto, wherein in the position control process, a parking position adjustment instruction is given to either one of the vehicle-to-be-charged or a parking-section-for-charging sliding mechanism for moving vehicles parked in the charging area so as to make a first spacing wider than a second spacing, the first spacing being a spacing between the vehicle-to-be-charged and an adjacent vehicle on a charge port side of the vehicle-to-be-charged and the second spacing being a spacing between the vehicle-to-be-charged and an adjacent vehicle on a side opposite the charge port side of the vehicle-to-be-charged.

Another exemplary aspect is a vehicle position management method for a charging system for charging a vehicle-to-be-charged among a plurality of vehicles placed on standby in a charging area by connecting a charging cable extending from a charging apparatus to the vehicle-to-be-charged, comprising:

giving a parking position adjustment instruction to the vehicle-to-be-charged so as to make a first spacing wider than a second spacing, the first spacing being a spacing between the vehicle-to-be-charged and an adjacent vehicle on a charge port side of the vehicle-to-be-charged and the second spacing being a spacing between the vehicle-to-be-charged and an adjacent vehicle on a side opposite the charge port side of the vehicle-to-be-charged; and connecting the charging cable to either one of the vehicle-to-be-charged or a parking-section-for-charging sliding mechanism for moving vehicles parked in the charging area by operating the arm mechanism within a range of the first spacing.

A charging system, a vehicle position management program for a charging system, and a vehicle position management method for a charging system according to the present disclosure are each adapted to park a vehicle so that a first spacing required for handling the arm mechanism on the charge port side of the vehicle is wider than a second spacing on a side opposite the charge port side of the vehicle. According to the present disclosure, it is possible to increase the number of vehicles that can be parked in a parking area having a limited size while securing a space for handling the arm mechanism.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
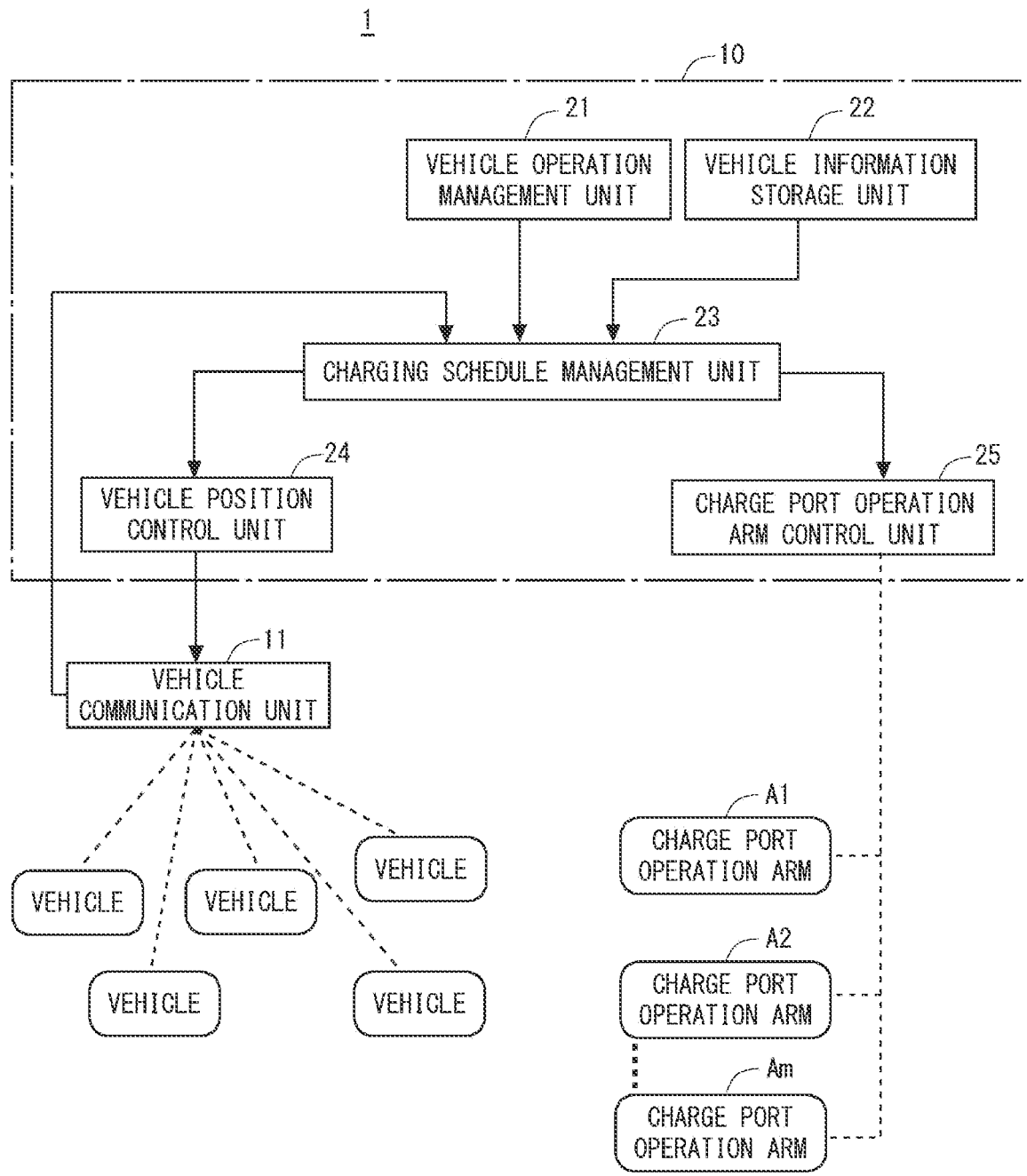
FIG. 1 is a block diagram of a charging system according to a first embodiment.

The same or corresponding elements are denoted by the same reference numerals (or symbols) throughout the drawings, and redundant descriptions thereof are omitted as required for clarifying the explanation. Further, each of the elements shown in the drawings as function blocks indicating various processes can be configured of a CPU (Central Processing Unit), a memory, and other circuits in terms of a hardware configuration, and can be implemented by programs loaded in a memory or the like in terms of a software configuration. Therefore, a skilled person in the art can understand that these function blocks can be realized in various forms such as a hardware configuration alone, a software configuration alone, or a combination thereof, and are not limited to any one of them. Note that the same or corresponding elements are denoted by the same reference numerals (or symbols) throughout the drawings, and redundant descriptions thereof are omitted as required.

The above-described program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

First Embodiment

In a charging system described below, a charging plug provided at the tip of a charging cable is inserted into a charge port (i.e. socket) of a vehicle such as a battery electric vehicle using an arm mechanism, and the battery electric vehicle is charged accordingly. Here, in the charging system, a vehicle-to-be-charged includes not only a vehicle which a person who is a to-be-occupant of the vehicle can get into but also includes a vehicle that can travel autonomously without any human driver on board. Further, in a parking area which is a region to be managed by the charging system, vehicles travel by following instructions from the charging system.

FIG. 1 shows a block diagram of a charging system 1 according to a first embodiment. Note that parking areas that are managed by the charging system are omitted in FIG. 1. As shown in FIG. 1, the charging system 1 according to the first embodiment includes a control unit (e.g. a management apparatus 10) and a vehicle communication unit 11. Further, in FIG. 1, vehicles-to-be-managed by the charging system 1 and an arm mechanism (e.g. charge port operation arms A1 to Am (m is an integer indicating the number of the charge port operation arms)) to be controlled by the charging system 1 are shown. It is to be noted that the number of the vehicles to be managed by the charging system 1 may be one, and there is no need to manage a plurality of vehicles.

First, the charging system 1 includes an arm mechanism (e.g. the charge port operation arms A1 to Am) for grasping a charging plug connected to a charging apparatus through a charging cable and automatically performing plugging/unplugging of the charging plug to and from a charge port of a vehicle located at a charging area. Then, the charging system 1 connects the charging cable extending from the charging apparatus to a vehicle-to-be-charged among a plurality of vehicles that are placed on standby in the charging area and performs charging of the vehicle-to-be-charged. Further, the charging system 1 indicates, using the control unit (e.g. the management apparatus 10), the charging position at which the charging cable is connected to the vehicle-to-be-charged. At this time, the management apparatus 10 gives a parking position adjustment instruction to either one of the vehicle-to-be-charged or a parking-section-for-charging sliding mechanism for moving vehicles parked in the charging area so as to make a first spacing wider than a second spacing, the first spacing being a spacing between the vehicle-to-be-charged and an adjacent vehicle on the charge port side of the vehicle-to-be-charged and the second spacing being a spacing between the vehicle-to-be-charged and an adjacent vehicle on the side opposite the charge port side of the vehicle-to-be-charged. Note that in the first embodiment, a parking position adjustment instruction is given to the vehicle-to-be-charged. Further, the charging system 1 have the management apparatus 10 perform communication with a vehicle using the vehicle communication unit 11 and provides a traveling route to the vehicle and instructs the vehicle to move along the traveling route. The vehicle communication unit 11 controls communication performed between the management apparatus 10 and the vehicle based on the prescribed communication protocols.

The process blocks shown in the management apparatus 10, which is shown in FIG. 1, can be implemented by an exclusive hardware or by executing programs in an operation unit of an operation device such as a computer. Further, as regards a storage unit among the process blocks shown in the management apparatus 10, it can be realized by a storage apparatus that is accessible by a computer.

The management apparatus 10 includes a vehicle operation management unit 21, a vehicle information storage unit 22, a charging schedule management unit 23, a vehicle position control unit 24, and a charge port operation arm control unit 25. The vehicle operation management unit 21 manages exit/entry of a vehicle out of/into a parking space in accordance with a request from a user of the vehicle. Further, the vehicle operation management unit 21 performs communication with a vehicle using a communication channel (not shown) and determines the operation schedule of the vehicle and confirms the traveling distance of the vehicle and the battery level of the vehicle. The vehicle information storage unit 22 is a database for holding specifications by vehicle types such as the position of a charge port, the standards of the charge port, the full-charge capacity of the vehicle-to-be-managed, and the like.

The charging schedule management unit 23 generates a charging schedule for efficiently performing charging of a vehicle-to-be-managed based on the state of the vehicle, the operation schedule, and the specifications of the vehicle obtained from the vehicle operation management unit 21 and the vehicle information storage unit 22. Details of the aforementioned charging schedule generation process will be described later.

Based on the charging schedule generated by the charging schedule management unit 23, the vehicle position control unit 24 designates a parking position for a vehicle that has entered the parking area, changes the parking position of the vehicle to that for charging, and instructs the vehicle to travel. The charge port operation arm control unit 25 instructs the charge port operation arms A1 to Am to select the charging cable according to the charging schedule generated by the charging schedule management unit 23 and to perform operation of inserting the charging plug into the insertion port of the vehicle.

Figure 2:
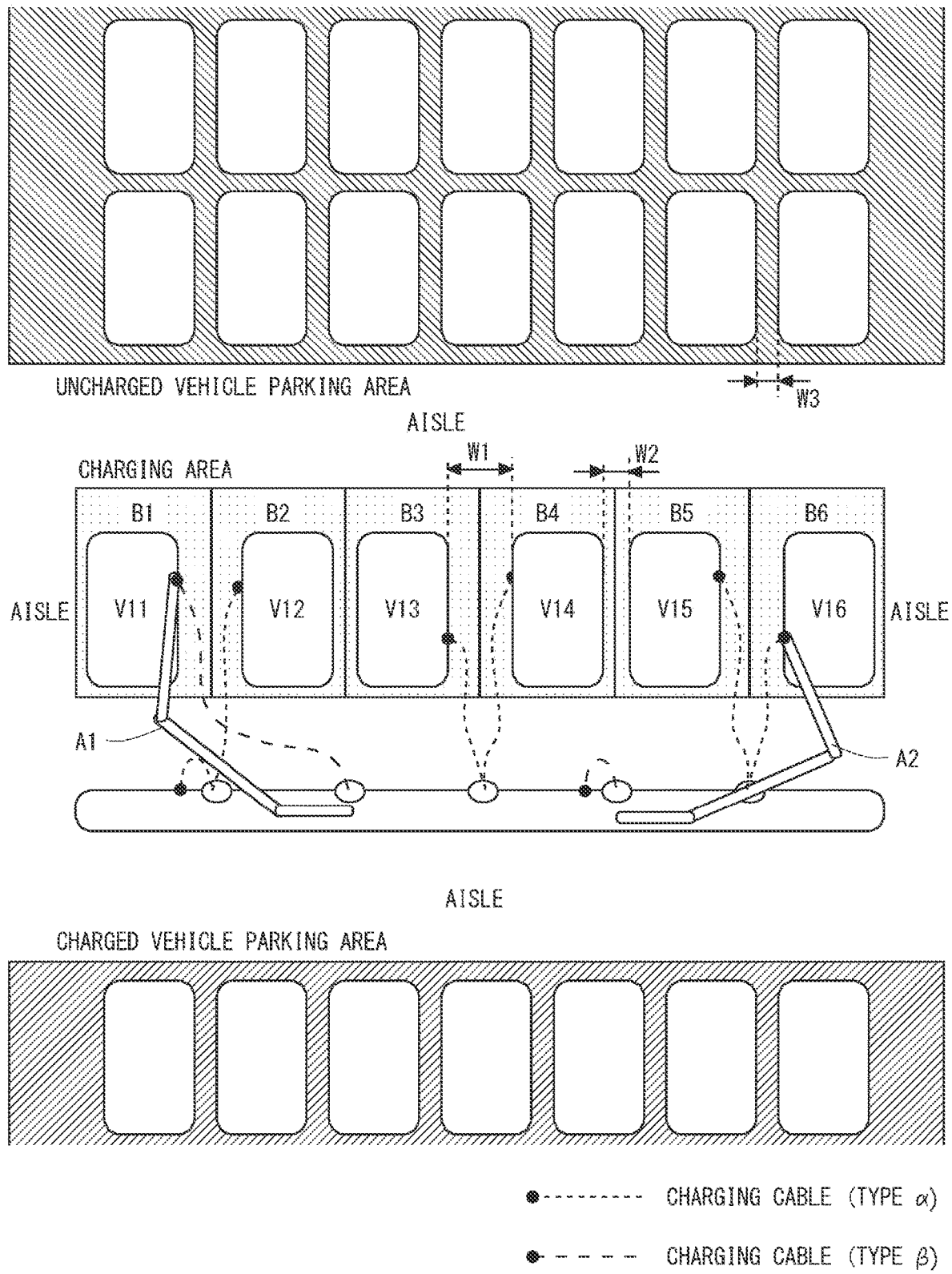
FIG. 2 is a schematic diagram of parking areas in the charging system according to the first embodiment.

Here, a configuration of parking areas of the charging system 1 according to the first embodiment will be described. FIG. 2 shows a schematic diagram of the parking areas in the charging system according to the first embodiment. As shown in FIG. 2, a charging apparatus 30 is disposed in the parking area. A charging area corresponding to the charging apparatus 30 is provided. Further, in the example shown in FIG. 2, a plurality of (six in FIG. 2) parking sections B1 to B6 for charging are provided in the charging area. The example shown in FIG. 2 shows a state in which vehicles V11 to V16 are respectively parked in the parking sections B1 to B6 for charging. In the example shown in FIG. 2, the parking sections for charging B1, B3, and B5 are parking sections for parking vehicles-to-charged with respective charge ports located on the left-hand side thereof, and parking sections for charging B2, B4, and B6 are charging sections for parking vehicles-to-be-charged with respective charge ports located on the right-hand side thereof.

In the charging system 1 according to the first embodiment, in a state in which the vehicles-to-be-charged parked at the parking sections for charging in the charging area are being charged, the parking state of the vehicles are controlled so that a first spacing W1 between the adjacent vehicles on the respective charge port sides is made wider than a second spacing W2 between the adjacent vehicles on the side opposite to the respective charge port sides (sides of the vehicles on which the respective charge ports are not located). Further, in the charging system 1 according to the first embodiment, the vehicle-to-be-charged are given a parking position adjustment instruction according to which the vehicles-to-be-charged are made to move from the uncharged vehicle parking area to be parked in the charging area in such a way that the first spacing W1 is made wider than a third spacing W3 which is a spacing between the adjacent vehicles parked in the uncharged vehicle parking area.

Further, the parking areas managed by the charging system 1 include an uncharged vehicle parking area for parking vehicles that are not yet charged and a charged vehicle parking area for parking vehicles that have been charged are on standby. A vehicle that has entered the parking area is parked in the uncharged vehicle parking area and a vehicle that has been charged is parked in the charged vehicle parking area where it waits to exit the parking area.

Further, in the example shown in FIG. 2, the charging apparatus 30 has charging cables that are compatible with the standards of two types of charge ports. In the example shown in FIG. 2, charging cables to each of which a charging plug compatible with the charge port type α is provided and charging cables to each of which a charging plug compatible with the charge port type β is provided are shown. Further, the charge port operation arms A1 and A2 are attached to the charging apparatus 30. In FIG. 2, two charge port operation arms that correspond to the charging area are shown, but the number of the charge port operation arm may be one.

Further, as shown in FIG. 2, in the charging system 1 according to the first embodiment, the vehicles-to-be-charged are parked in the parking sections for charging in the charging area so that the charge port side of the vehicle-to-be-charged which is parked in the odd-numbered parking section for charging and the charge port side of the vehicle-to-be-charged which is parked in the even-numbered parking section for charging face each other. Then, in the charging system 1 according to the first embodiment, by parking the vehicles in the respective parking sections for charging so that they are offset from the respective centers of the parking sections, the first spacing W1 between the adjacent vehicles on the respective charge port sides is made wider than the second spacing W2 between the adjacent vehicles on the side opposite to the respective charge port sides (sides of the vehicles on which the respective charge ports are not disposed). Further, the first spacing W1 in the charging area is wider than the third spacing W3 which is a spacing between the adjacent vehicles parked in the uncharged vehicle parking area.

The charging system 1 makes the vehicle parked in the uncharged vehicle parking area travel to the parking section for charging in the charging area designated by the charging system and makes the vehicle for which charging has been completed travel to the charged vehicle parking area by using aisles on either side of the charging area as a route thereof. In this way, the charging system 1 according to the first embodiment adjusts the parking section and the style of parking for each of the vehicles in accordance with the positions of the respective charge ports. That is, in the charging system 1 according to the first embodiment, an instruction to travel given to a vehicle-to-charged is equivalent to a parking position adjustment instruction.

Figure 3:
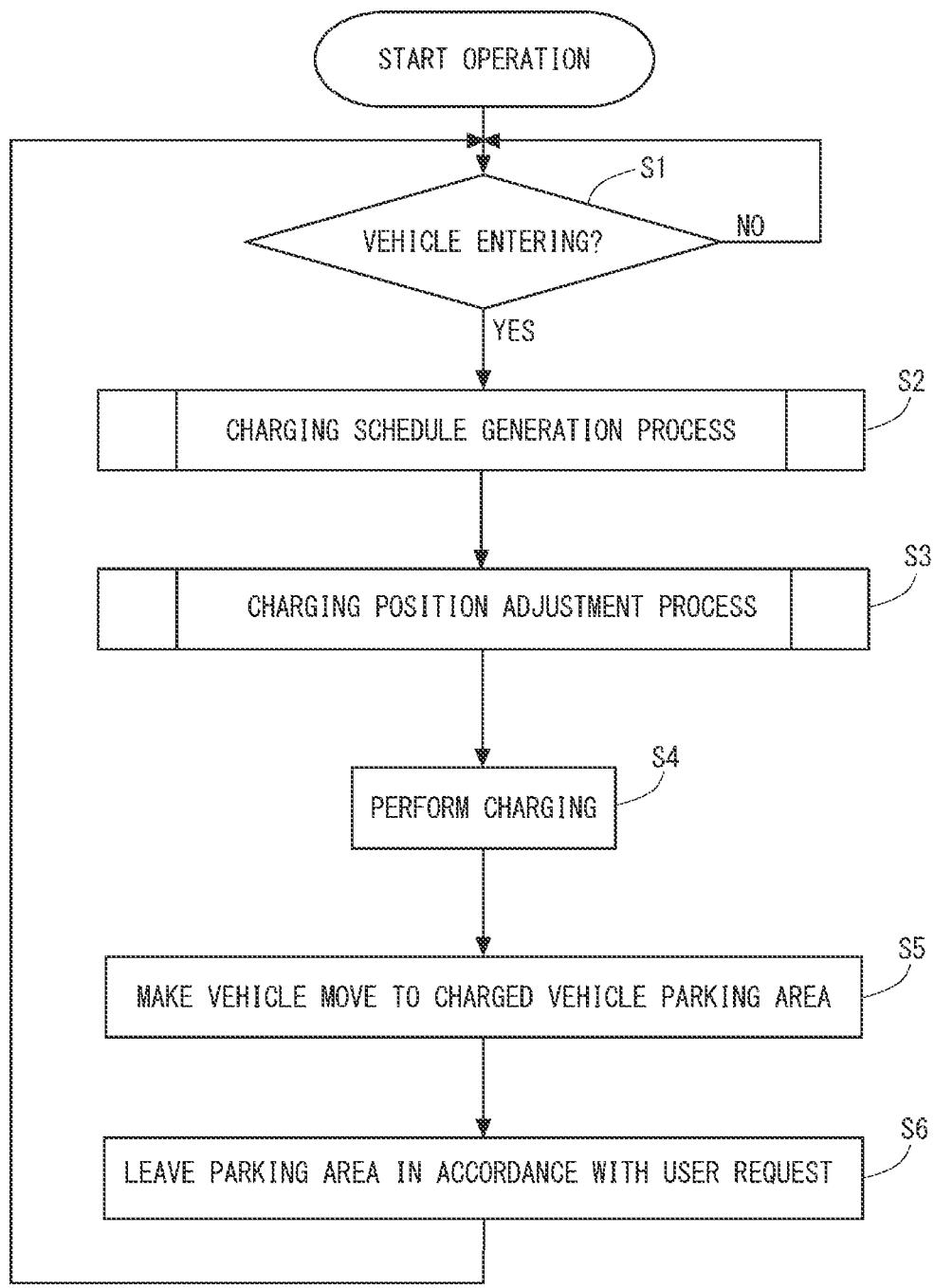
FIG. 3 is a flowchart for explaining operations of the charging system according to the first embodiment.

Next, how the charging system 1 according to the first embodiment operates will be described. FIG. 3 shows a flowchart for explaining operations of the charging system 1 according to the first embodiment. As shown in FIG. 3, in the charging system 1 according to the first embodiment, various processes are stated in accordance with entry of a vehicle in the parking area (Step 51). In the charging system 1 according to the first embodiment, a charging schedule generation process is performed based on the information of the vehicle that has entered the parking area (Step S2). Then, based on the charging schedule generated in Step S2, the management apparatus 10 performs charging position adjustment process of determining the specific parking section for charging the vehicle-to-be-charged and the parking orientation of the vehicle at the time of charging thereof (Step S3). The aforementioned charging position designation process of Step S3 is performed by, for example, the vehicle position control unit 24. Details of the aforementioned charging position designation process will be described later.

Then, the charging system 1 according to the first embodiment performs charging of the vehicle-to-be-charged utilizing the parking section for charging determined in the charging position designation process of Step S3 (Step S4). After the charging is completed, the charging system 1 moves the vehicle from the charging area to the charged vehicle parking area (Step S5), and in accordance with a request from the user, the vehicle parked in the charged vehicle parking area is made to exit the charged vehicle parking area (Step S6).

Figure 4:
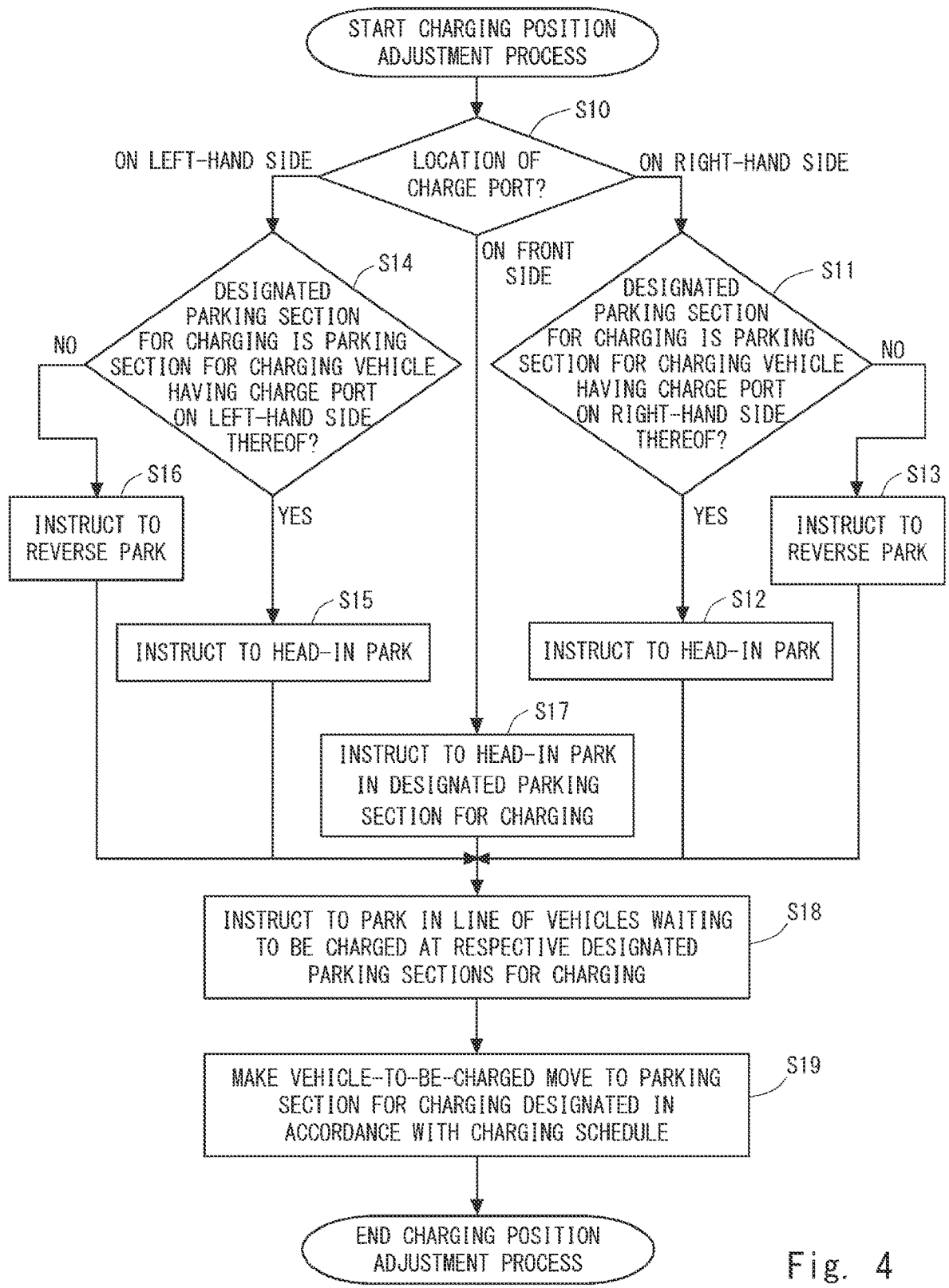
FIG. 4 is a flowchart for explaining a charging position adjustment process of the charging system according to the first embodiment.

Here, the charging position adjustment process will be described in detail. FIG. 4 shows a flowchart for explaining a charging position adjustment process of the charging system 1 according to the first embodiment. Explanation is given on the assumption that the charging position adjustment process shown in FIG. 4 is performed by the vehicle position control unit 24, however it may be performed by, for example, the charging schedule management unit 23. As shown in FIG. 4, in the charging position adjustment process, the vehicle position control unit 24 checks the position of the charge port of the vehicle that has newly entered the parking area by referring to the vehicle information stored in the vehicle information storage unit 22 (Step S10).

Then, in the case where the vehicle-to-be-charged has a charge port located on the right-hand side thereof, it is determined whether or not the parking section for charging designated for the vehicle-to-be-charged in accordance with the charging schedule is a parking section for charging a vehicle having a charge port located on the right-hand side thereof (Step S11). Then, in Step S12, in the case where the designated parking section for charging is a parking section for charging a vehicle having a charge port located on the right-hand side thereof, the vehicle position control unit 24 instructs the vehicle to head-in park in the designated parking section for charging (Step S12). On other hand, in Step S12, in the case where the designated parking section for charging is a parking section for charging a vehicle having a charge port located on the left-hand side thereof, the vehicle position control unit 24 instructs the vehicle to reverse park in the designated parking section for charging (Step S13).

Further, in the case where the vehicle-to-charged has a charge port located on the left-hand side thereof, it is determined whether or not the parking section for charging designated for the vehicle-to-be-charged in accordance with the charging schedule is a parking section for charging a vehicle having a charge port on the left-hand side thereof (Step S14). Then, in Step S15, in the case where the designated parking section for charging is a parking section for charging a vehicle having a charge port located on the left-hand side thereof, the vehicle position control unit 24 instructs the vehicle to head-in park in the designated parking section for charging (Step S15). On other hand, in Step S15, in the case where the designated parking section for charging is a parking section for charging a vehicle having a charge port located on the right-hand side thereof, the vehicle position control unit 24 instructs the vehicle to reverse park in the designated parking section for charging (Step S16).

Further, in the case where the vehicle-to-charged has a charge port located on the front side thereof, the vehicle position control unit 24 instructs the vehicle to head-in park in the designated parking section for charging regardless of whether or not the parking section for charging designated for the vehicle-to-be-charged in accordance with the charging schedule is a parking section for charging a vehicle having a charge port on the left-hand side thereof or a parking section for charging a vehicle having a charge port on the right-hand side thereof (Step S17). Then, the vehicle position control unit 24 instructs the vehicle-to-be-charged to park in a line of vehicles that are waiting to be charged at the respective designated parking sections for charging (Step S18). Then, the charging system 1 according to the first embodiment, makes the vehicle-to-be-charged move in a designated traveling direction to the parking section for charging designated in accordance with the charging schedule (Step S19). Then, upon completion of Step S19, the charging position adjustment process ends.

As described above, in the charging system 1 according to the first embodiment, when charging a vehicle at the charging area, control is performed so as to make the first spacing W1 between adjacent vehicles on the respective charge port sides wider than the second spacing W2 between adjacent vehicles on the side opposite to the respective charge port sides. Accordingly, in the charging system 1 according to the first embodiment, it is possible to increase the number of vehicles that can be parked (i.e. enhance parking efficiency) in a charging area having a limited size.

Further, in the charging system 1 according to the first embodiment, the vehicles-to-be-charged are parked in the parking sections for charging so that they are offset from the respective centers of the parking sections and so that the adjacent vehicles-to-be-charged are parked with their respective charge port sides facing each other. By this configuration, the charging system 1 according to the first embodiment can enhance parking efficiency in the charging area.

Further, in the charging system 1 according to the first embodiment, only the parking position and the parking orientation of a vehicle in the parking section for charging in the charging area are adjusted in the charging position adjustment process, and it has an advantage that a mechanical mechanism for making the vehicle move can be dispensed with.

Second Embodiment

In a second embodiment, a charging system 2 that is another embodiment of the charging system 1 will be described. In the description given in the second embodiment, structural elements that are the same as those explained in the first embodiment are denoted by the identical reference symbols and the redundant explanations thereof are omitted.

In the charging system 2 according to the second embodiment, a parking-section-for-charging sliding mechanism that can slide a vehicle parked in the parking section for charging in at least one of the longitudinal direction and the lateral direction, and temporarily widens the spacing between the vehicles that are parked when connecting the charging cables to the respective charge ports. A block diagram of the charging system 2 according to the second embodiment is shown in FIG. 5.

Figure 5:
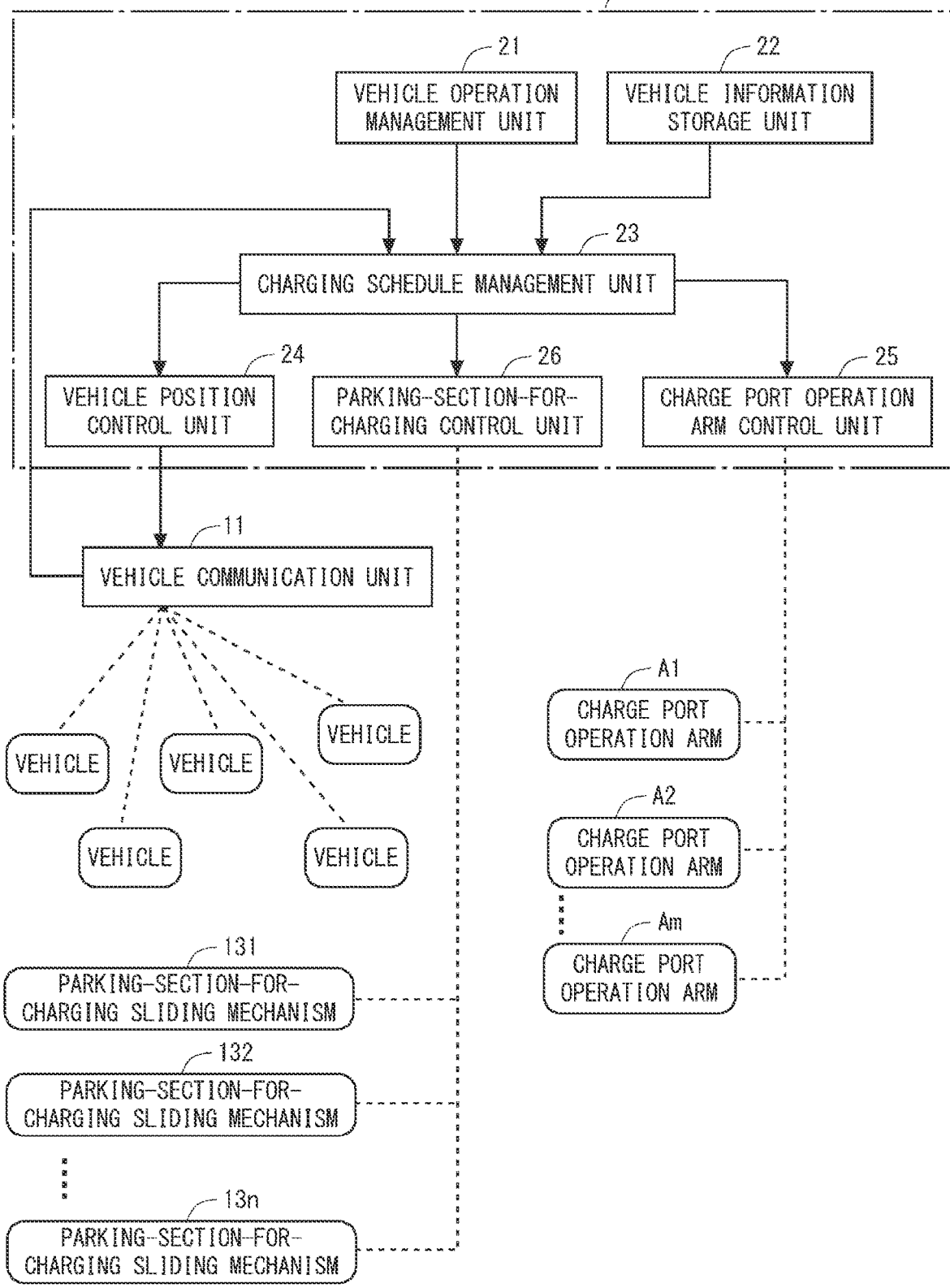
FIG. 5 is a block diagram of a charging system according to a second embodiment.

As shown in FIG. 5, the charging system 2 according to the second embodiment includes a management apparatus 10a in place of the management apparatus 10. The management apparatus 10a is obtained by adding a parking-section-for-charging control unit 26 added to the control apparatus 10. Note that in the second embodiment, the vehicle position control unit 24 does not perform the charging position adjustment process and only gives an instruction to the vehicles to move in accordance with the charging schedule.

Further, as shown in FIG. 5, the charging system 2 according to the second embodiment includes parking-section-for-charging sliding mechanisms 131 to 13n (n is an integer indicating the number of the parking section for charging sliding mechanism). The parking-section-for-charging sliding mechanisms 131 to 13n correspond to respective one of the parking sections for charging.

The parking-section-for-charging control unit 26 gives a parking position adjustment instruction to at least one of a parking-section-for-charging sliding mechanism located at a parking section for charging of a vehicle-to-be-charged among a plurality of parking-section-for-charging sliding mechanisms 131 to 13n located at a parking section for charging in the charging area and a parking-section-for-charging sliding mechanism located at a parking section for charging of a vehicle parked adjacent to the aforementioned vehicle-to-be-charged. Here, the charging section sliding mechanism to which the parking-section-for-charging control unit 26 give a parking position adjustment instruction is determined in accordance with the charging schedule generated by the charging schedule management unit 23.

Figure 6:
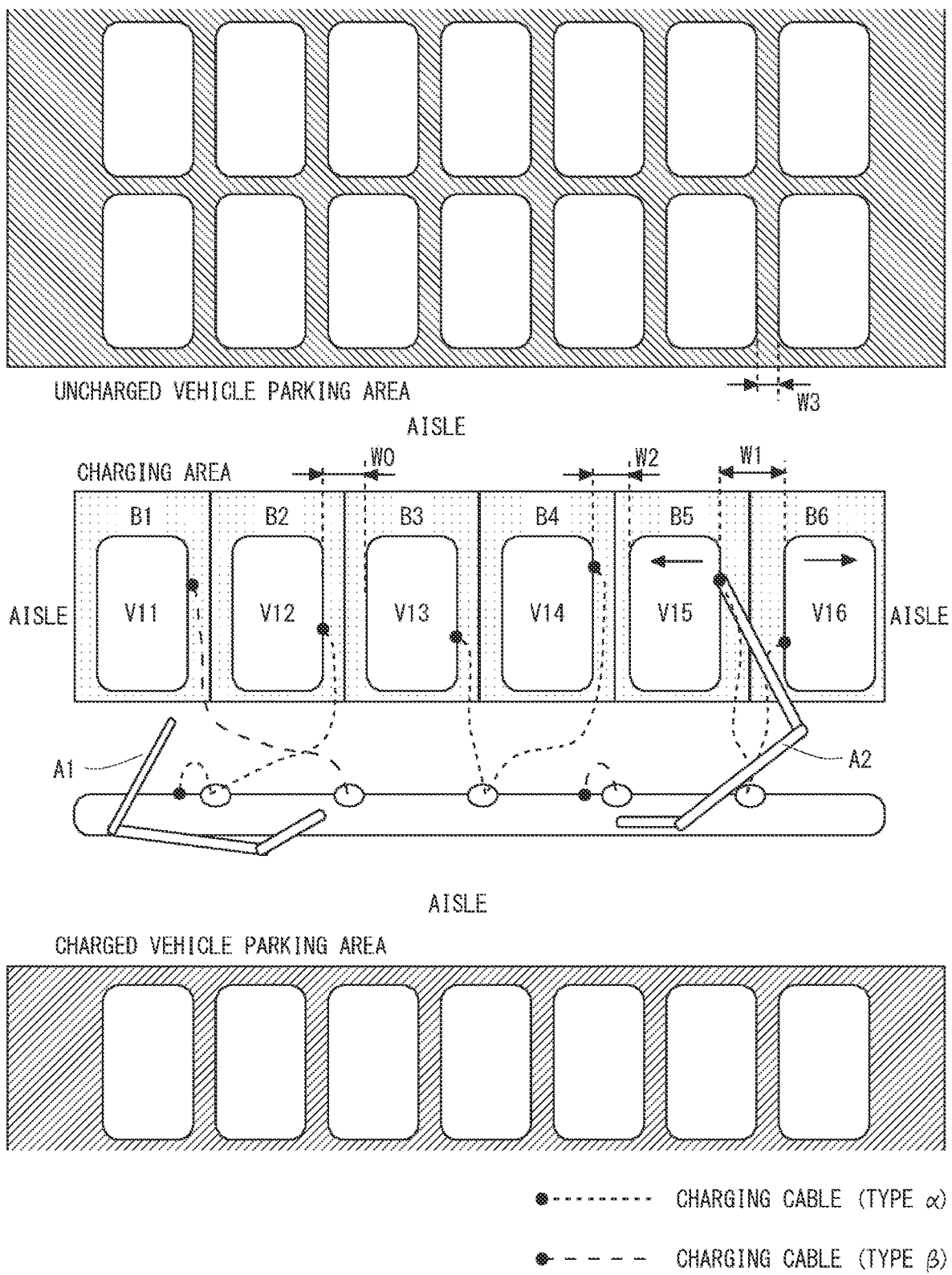
FIG. 6 is a schematic diagram of a parking area in the charging system according to the second embodiment.

Here, a schematic diagram of a parking area in the charging system 2 according to the second embodiment is shown in FIG. 6. In the example shown in FIG. 6, the configuration of the charging system is the same as the charging system 1 according to the first embodiment shown in FIG. 2 except for the configuration of the charging area. In the charging area of the charging system 2 according to the second embodiment, the vehicles-to-be-charged are parked at the central area of the parking section for charging. Then, while the charge port operation arm grabs the charging cable and connects the charging cable to the charge port, the spacing between the vehicles are temporarily widened. FIG. 6 shows a state in which when connecting the charging cable to the vehicle V15 parked in the parking section for charging B5 using the charge port operation arm A1, the parking-section-for-charging sliding mechanism of the parking section for charging B5 and the parking-section-for-charging sliding mechanism of the parking section for charging B6 that is adjacent to the parking section for charging B5 on the charge port side of the vehicle-to-be-charged are given parking position adjustment instructions so that the spacing between the vehicle V15 and the vehicle V16 is widened.

In the charging system 2 according to the second embodiment, the first spacing W1 between the vehicle to which connection of a charging cable is in progress and an adjacent vehicle parked on the charge port side of the vehicle to which connection of a charging cable is in progress is wider than the second spacing W2 between the vehicle to which connection of a charging cable is in progress and an adjacent vehicle parked on the side opposite toe the charge port side of the vehicle to which the connection of a charge port is in progress. Further, the spacing between the vehicles for which connection of the charging cables is not in progress is W0 and this spacing W0 is narrower than the first spacing W1 and wider than the second spacing W2.

Figure 7:
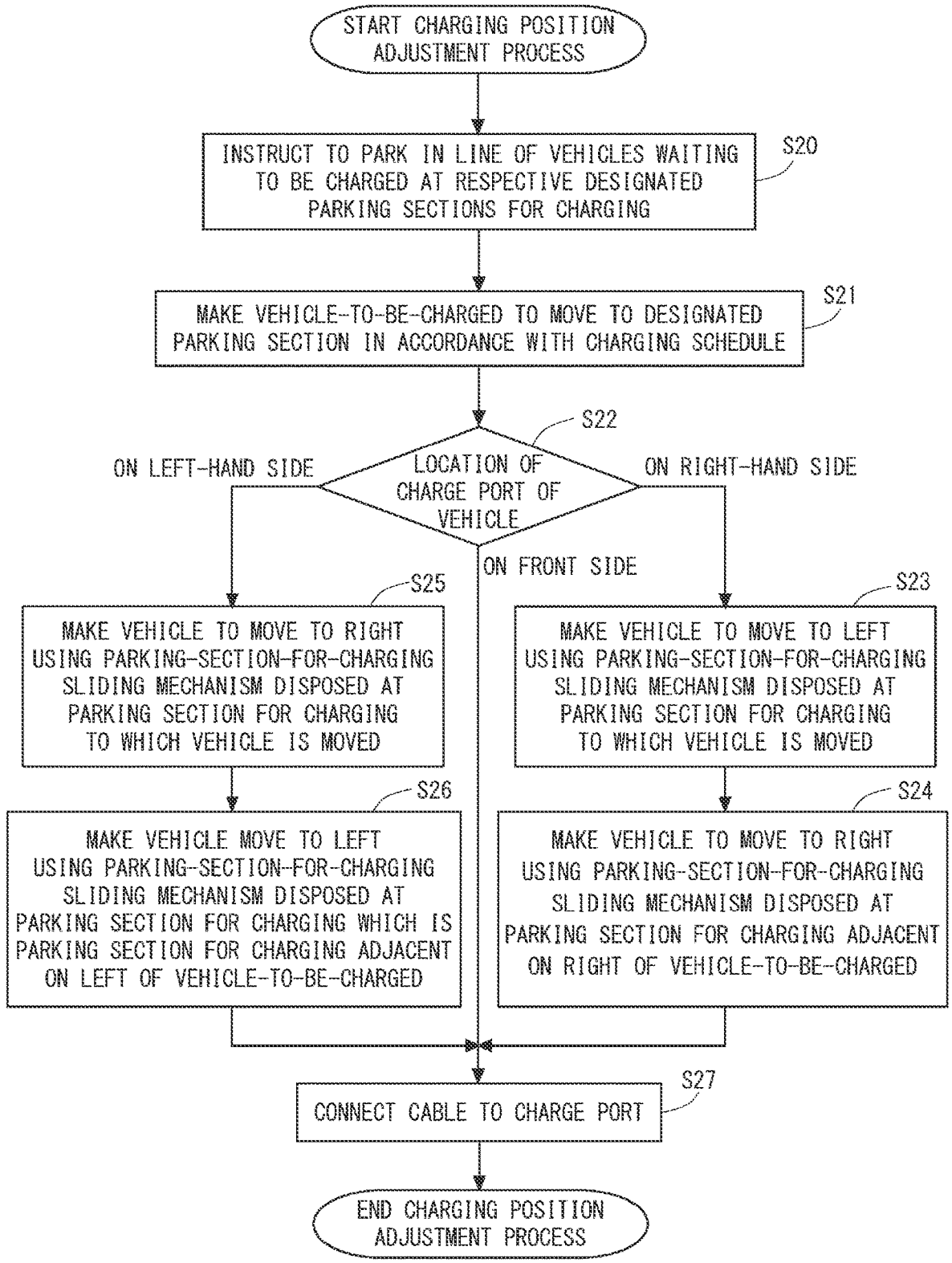
FIG. 7 is a flowchart for explaining charging position adjustment process of the charging system according to the second embodiment.

Next, the operation of the charging system 2 according to the second embodiment will be described. In the charging system 2 according to the second embodiment, the charging position adjustment process of Step S3 shown in FIG. 3 is different from that of the charging system 1 according to the first embodiment. Hereinbelow, the charging system 2 according to the second embodiment will be described in detail. FIG. 7 shows a flowchart for explaining charging position adjustment process of the charging system according to the second embodiment.

As shown in FIG. 7, in the charging position adjustment process according to the second embodiment, the vehicle position control unit 24 instructs the vehicle-to-be-charged to park in a line of vehicles that are waiting to be charged at the respective designated parking sections in accordance with the charging schedule (Step S20). Then, the charge port operation arm control unit 25 makes the vehicle-to-be-charged for which the scheduled time for charging in accordance with the charging schedule has been reached to move to the designated parking section for charging designated in the charging schedule (Step S21).

Next, in the charging system 2 according to the second embodiment, the parking-section-for-charging control unit 26 checks the position of the charge port of the vehicle-to-be-charged by referring to the information in the charging schedule (Step S22). In Step S22, when it is determined that the charge port is on the right-hand side of the vehicle, the parking-section-for-charging control unit 26 makes the vehicle-to-be-charged move to the left using the parking-section-for-charging sliding mechanism of the parking section for charging to which the vehicle-to-be-charged is to be moved (Step S23). Further, the parking-section-for-charging control unit 26 makes the vehicle-to-be-charged, which is the target of control in Step S23, move to the right using the parking-section-for-charging sliding mechanism of the parking section for charging which is a parking section for charging adjacent on the right of the vehicle-to-be-charged parked in the parking section for charging (Step S24).

On the other hand, in Step S22, when it is determined that the charge port is on the left-hand side of the vehicle, the parking-section-for-charging control unit 26 makes the vehicle-to-be-charged move to the right using the parking-section-for-charging sliding mechanism disposed at the parking section for charging to which the vehicle-to-be-charged is to be moved (Step S25). Further, the parking-section-for-charging control unit 26 makes the vehicle-to-be-charged move to the left using the parking-section-for-charging sliding mechanism disposed at the parking section for charging adjacent on the left of parking section for charging which is controlled in Step S25 (Step S26).

Further, when it is determined in Step S22 that the vehicle-to-charged has a charge port located on the front side thereof, the parking-section-for-charging control unit 26 does not instruct the parking-section-for-charging sliding mechanism to move the vehicle. Then, after the process of Step S24 or Step S26 is completed, the charge port operation arm control unit 25 connect a charging cable to the charge port of the vehicle-to-be-charged by operating the charge port operation arm (Step S27). Note that although not illustrated in FIG. 7, the parking-section-for-charging control unit 26 controls the parking-section-for-charging sliding mechanism to restore the vehicle position which was moved in Steps S23 to S26 in accordance with the charge port operation arm being brought to a standby state.

As described above, in the charging system 2 according to the second embodiment, the spacing between a vehicle-to-be-charged to which a charging cable is to be connected and a vehicle parked adjacent to the vehicle-to-be-charged on the charge port side of the vehicle-to-be-charged is temporarily widened while the vehicle-to-be-charged is being charged. By this configuration, in the charging system 2 according to the second embodiment, the number of vehicles that can parked relative to the size of the charging area can be increased.

Further, in the charging system 2 according to the second embodiment, it is possible to head-in park the vehicle-to-be-charged in any of the parking sections for charging regardless of the location of the charge port of the vehicle. That is, in the charging system 2 according to the second embodiment, there is no need to take into consideration the location of the charge port of a vehicle and the parking orientation of the vehicle in the charging area. By this configuration, the charging system 2 according to the second embodiment can generate a charging schedule in which the charging efficiency is prioritized compared to the charging system 1 according to the first embodiment. Further, in the charging system 2 according to the second embodiment, it is possible to reduce the number of times the vehicles that have entered the charging area move compared to the charging system 1 according to the first embodiment.

Third Embodiment

In a third embodiment, details of a charging schedule generation process shown in the flowchart of FIG. 3 will be described. Note that in the description of the third embodiment, the same or corresponding elements as those described in the first and the second embodiments are denoted by the same reference numerals (or symbols), and descriptions thereof are omitted.

Figure 8:
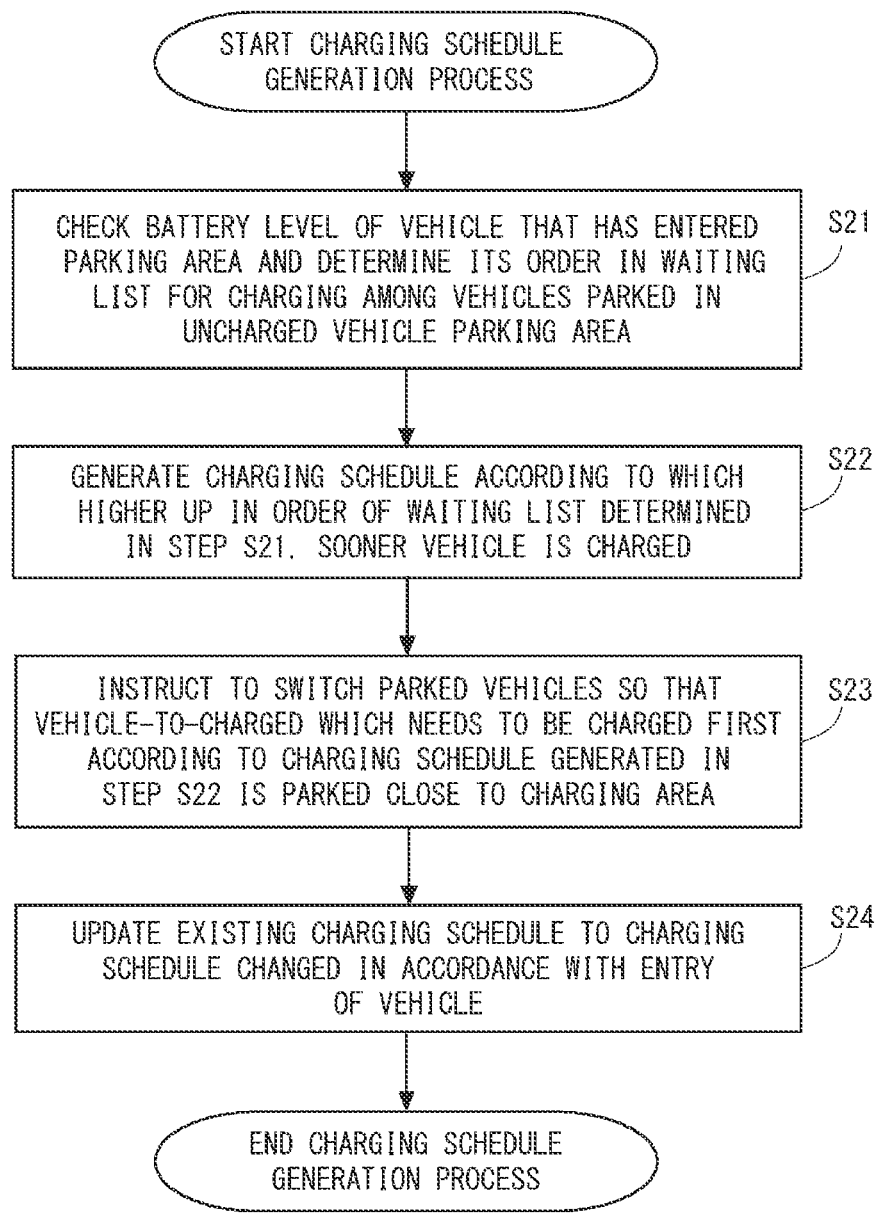
FIG. 8 is a flowchart for explaining a charging schedule generation process of a charging system according to a third embodiment.

FIG. 8 shows a flowchart for explaining a charging schedule generation process of a charging system according to a third embodiment. The charging schedule generation process according to the third embodiment is performed by the charging schedule management unit 23. In the aforementioned charging schedule generation process, first, the battery level of vehicle that has entered the parking area is checked, and its order in the waiting list for charging among the vehicles parked in the uncharged vehicle parking area is determined (Step S21).

Then, charging schedule management unit 23 generates a charging schedule according to which the higher up in the order of the waiting list for vehicles-to-be-charged determined in Step S21, the sooner the vehicle can be charged (Step S22). Next, the charging schedule management unit 23 instructs the vehicle position control unit 24 to switch the parked vehicles so that the vehicle-to-charged which needs to be charged first according to the charging schedule generated in Step S22 is parked close to the charging area (Step S23). Based on the aforementioned instruction of Step S23, the vehicle position control unit 24 gives an instruction to the vehicle to move so that the shorter the waiting time to be charged for the vehicle waiting to be charged in the uncharged vehicle parking area, the closer the vehicle is parked to the charging apparatus 30. Then, the charging schedule management unit 23 performs update of the charging schedule so that the charging schedule which the charging schedule management unit 23 was holding before the charging schedule was generated in Step S22 is updated to the charging schedule generated in Step S22 (Step S24).

As described above, in the charging schedule generation process according to the third embodiment, a charging schedule is generated according to which a vehicle having a low battery level is charged sooner than vehicles having higher battery levels. Accordingly, the charging system according to the third embodiment can reduce the number of vehicles having a low battery level and that are difficult to be operated continuously and maintain a state in which there are a large number of vehicles that are operable.

Fourth Embodiment

In a fourth embodiment, another embodiment of a charging schedule generation process shown in FIG. 3 will be described. In the description given in the third embodiment, structural elements that are the same as those explained in the first and the second embodiments are denoted by the identical reference symbols and the redundant explanation thereof is omitted.

Figure 9:
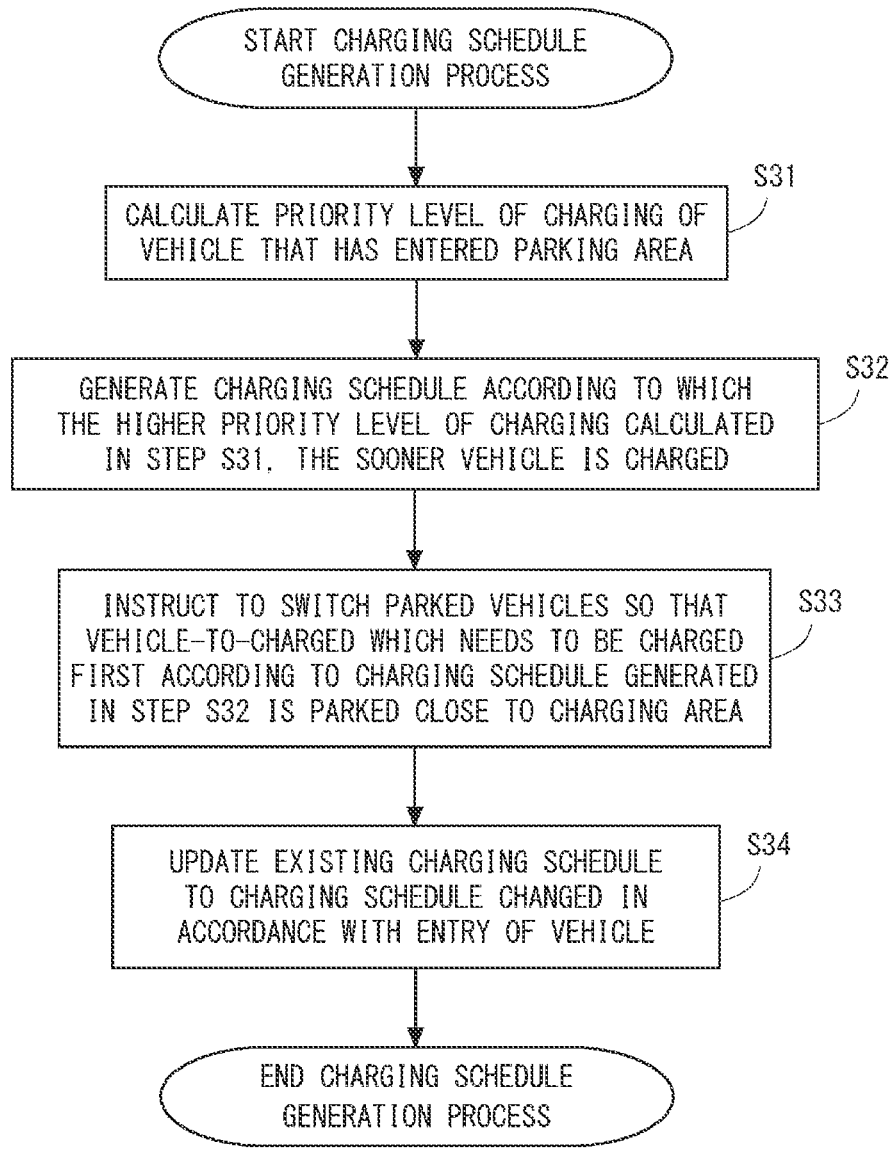
FIG. 9 is a flowchart for explaining a charging schedule generation process of a charging system according to a fourth embodiment.

FIG. 9 shows a flowchart for explaining a charging schedule generation process of a charging system according to a fourth embodiment. The charging schedule generation process according to the fourth embodiment is performed by the charging schedule management unit 23. In the fourth embodiment, a charging schedule is generated so that the higher the priority level of charging of the vehicle that has entered the parking area, the sooner the vehicle is charged.

Next, the priority level of charging will be described. The priority level of charging can be calculated based on various indices and here, examples of three priority levels will be described.

In a first example, the priority level of charging is one that is calculated based on the next-coming departure time of a vehicle-to-be-charged. To be more specific, the priority level of charging in the first example is one that becomes higher for a vehicle whose departure time is closer to the current time.

In a second example, the priority level of charging is one that is calculated based on the state of use of the vehicle-to-be-charged. To be more specific, the priority level of charging in the second example is one that is determined based on the time taken for the battery of the vehicle to be fully charged and the longer the time taken for the battery of the vehicle to be fully charged, the higher the priority level becomes.

In a third example, the priority level of charging is calculated from an expression using two values of the time taken to fully charge the battery and the next departure time is used. The aforementioned priority level of charging can be expressed by the following Expression (1):

$$P = 1/(SOC(Tf-(Tf-Ts))) \tag{1}$$

wherein P denotes a priority level, SOC denotes a battery level at the time entry of a vehicle, Tf denotes time taken to fully charge a battery, and Ts denotes the time remaining until the next departure time.

From the aforementioned Expression (1), it can be understood that according to the priority level of charging of the third example, the indices are such that the shorter the time remaining until the next departure time, the higher the priority level, and the lower the battery level, the higher the priority level. Next, the charging schedule generation process according to the fourth embodiment will be described with reference to FIG. 9. The charging schedule generation process according to the fourth embodiment is performed by the charging schedule management unit 23. In the aforementioned charging schedule generation process, firstly, the priority level of charging of the vehicle that has entered the parking area is calculated (Step S31). The priority level of charging of the vehicle calculated in the aforementioned Step S31 is one that is described in the aforementioned first to third examples.

Then, charging schedule management unit 23 generates a charging schedule according to which the higher the priority level of charging calculated in Step S31, the sooner the vehicle can be charged (Step S32). Next, the charging schedule management unit 23 instructs the vehicle position control unit 24 to switch the parked vehicles so that the vehicle-to-charged which needs to be charged first according to the charging schedule generated in Step S32 is parked close to the charging area (Step S33). Based on the aforementioned instruction of Step S33, the vehicle position control unit 24 gives an instruction to the vehicle to move so that the shorter the waiting time to be charged for the vehicle waiting to be charged in the uncharged vehicle parking area, the closer the vehicle is parked to the charging apparatus 30. Then, the charging schedule management unit 23 performs update of the charging schedule so that the charging schedule which the charging schedule management unit 23 was holding before the charging schedule was generated in Step S32 is updated to the charging schedule generated in Step S32 (Step S34).

As described above, in the charging schedule generation process according to the fourth embodiment, charging is performed for vehicles having higher priority level of charging based on the state of use of the vehicle. Accordingly, the charging system according to the fourth embodiment can reduce the number of vehicles having a low battery level and thus cannot be operated continuously while maintaining a state in which there are a large number of vehicles that are operable with higher accuracy than the in the third embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A charging system for charging a vehicle-to-be-charged among a plurality of vehicles placed on standby in a charging area by connecting a charging cable extending from a charging apparatus to the vehicle-to-be-charged, comprising:
    an uncharged vehicle parking area for parking the vehicle-to-be-charged in addition to the charging area;
    a charge port operation arm configured to grasp the charging cable extending from the charging apparatus and connecting the charging cable to the vehicle-to-be-charged; and
    a management apparatus including a central processing unit configured to indicate the vehicle-to-be-charged of a charging position at which the charging cable is connected to the vehicle, wherein
    the central processing unit is further configured to give a parking position adjustment instruction for moving vehicles parked in the charging area by either one of the vehicle-to-be-charged or a parking-section-for-charging sliding mechanism so as to make a first spacing wider than a second spacing, the first spacing being a spacing between the vehicle-to-be-charged and an adjacent vehicle on a charge port side of the vehicle-to-be-charged and the second spacing being a spacing between the vehicle-to-be-charged and an adjacent vehicle on a side opposite the charge port side of the vehicle-to-be-charged, and
    the central processing unit gives the parking position adjustment instruction to the vehicle-to-be-charged according to which the vehicle-to-be-charged is made to move from the uncharged vehicle parking area to be parked in the charging area in such a way that the first spacing is made wider than a third spacing which is a spacing between adjacent vehicles parked in the uncharged vehicle parking area.

2. The charging system according to claim 1, wherein the central processing unit is further configured to give the parking position adjustment instruction for charging of the vehicle-to-be-charged in the charging area by the parking-section-for-charging sliding mechanism located at a parking section or give the parking position adjustment instruction for charging of a vehicle parked adjacent to the vehicle-to-be-charged by the parking-section-for-charging sliding mechanism located at the parking section.

3. The charging system according to claim 1, wherein the central processing unit gives the parking position adjustment instruction to the vehicle-to-be-charged so as to place the vehicle-to-be-charged having a first battery level on standby at a location distant from the charging apparatus.

4. The charging system according to claim 1, wherein the central processing unit calculates a priority level of charging for the vehicle-to-be-charged based on a state of use of a respective vehicle-to-be-charged and gives the parking position adjustment instruction to the vehicle-to-be-charged so as to place the vehicle-to-be-charged having a first battery level on standby at a location distance relative to a threshold to the charging apparatus.

5. The charging system according to claim 4, wherein the closer a departure time of the vehicle-to-be-charged is to the current time, the higher its priority level for charging is.

6. The charging system according to claim 4, wherein the shorter the time required to fully charge the vehicle-to-be-charged, the higher its priority level for charging is.

7. A non-transitory computer readable medium storing a vehicle position management program for a charging system for charging a vehicle-to-be-charged among a plurality of vehicles placed on standby in a charging area by connecting a charging cable extending from a charging apparatus to the vehicle-to-be-charged, the program being executed by a a management apparatus including a central processing unit of the charging system configured to indicate a charging position for the vehicle-to-be-charged and adapted to cause the charging system to perform:

a charge port operation arm control process of grasping the charging cable extending from the charging apparatus and connecting the charging cable to the vehicle-to-be-charged; and a positon control process of indicating the vehicle-to-be-charged a charging position for connecting the charging cable thereto, wherein, in the position control process, a parking position adjustment instruction for moving vehicles parked in the charging area is given by either one of the vehicle-to-be-charged or a parking-section-for-charging sliding mechanism so as to make a first spacing wider than a second spacing, the first spacing being a spacing between the vehicle-to-be-charged and an adjacent vehicle on a charge port side of the vehicle-to-be-charged and the second spacing being a spacing between the vehicle-to-be-charged and an adjacent vehicle on a side opposite the charge port side of the vehicle-to-be-charged, and wherein the parking position adjustment instruction is given to the vehicle-to-be-charged according to which the vehicle-to-be-charged is made to move from an uncharged vehicle parking area to be parked in the charging area in such a way that the first spacing is made wider than a third spacing which is a spacing between adjacent vehicles parked in the uncharged vehicle parking area, and wherein the uncharged vehicle parking area for parking the vehicle-to-be-charged is in addition to the charging area.

8. A vehicle position management method for a charging system for charging a vehicle-to-be-charged among a plurality of vehicles placed on standby in a charging area by connecting a charging cable extending from a charging apparatus to the vehicle-to-be-charged, comprising:

giving a parking position adjustment instruction to the vehicle-to-be-charged so as to make a first spacing wider than a second spacing, the first spacing being a spacing between the vehicle-to-be-charged and an adjacent vehicle on a charge port side of the vehicle-to-be-charged and the second spacing being a spacing between the vehicle-to-be-charged and an adjacent vehicle on a side opposite the charge port side of the vehicle-to-be-charged; and moving vehicles parked in the charging area by connecting the charging cable to either one of the vehicle-to-be-charged or a parking-section-for-charging sliding mechanism by operating a charge port operation arm within a range of the first spacing, wherein the parking position adjustment instruction is given to the vehicle-to-be-charged according to which the vehicle-to-be-charged is made to move from an uncharged vehicle parking area to be parked in the charging area in such a way that the first spacing is made wider than a third spacing which is a spacing between adjacent vehicles parked in the uncharged vehicle parking area, and the uncharged vehicle parking area for parking the vehicle-to-be-charged is in addition to the charging area.

* * * * *